M. J. TEEL.
VIBRATION ABSORBING DEVICE.
APPLICATION FILED AUG. 16, 1920.
1,383,350.
Patented July 5, 1921.
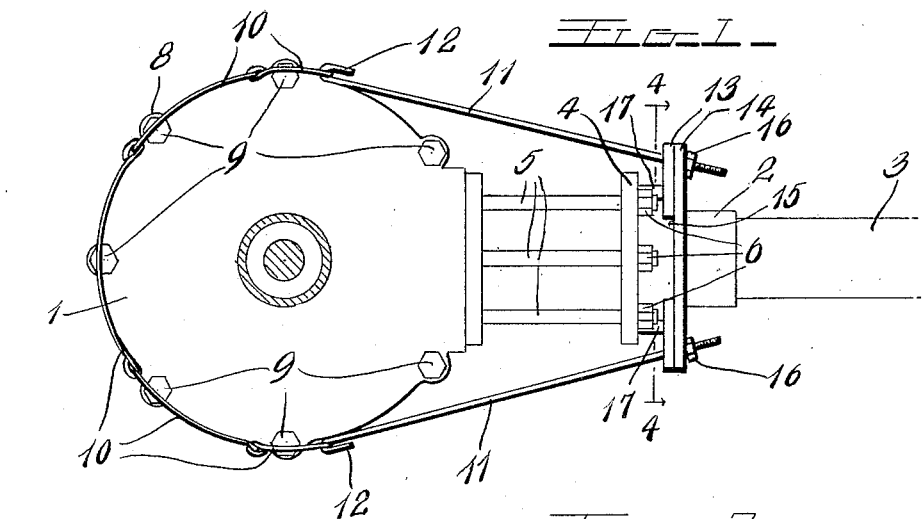
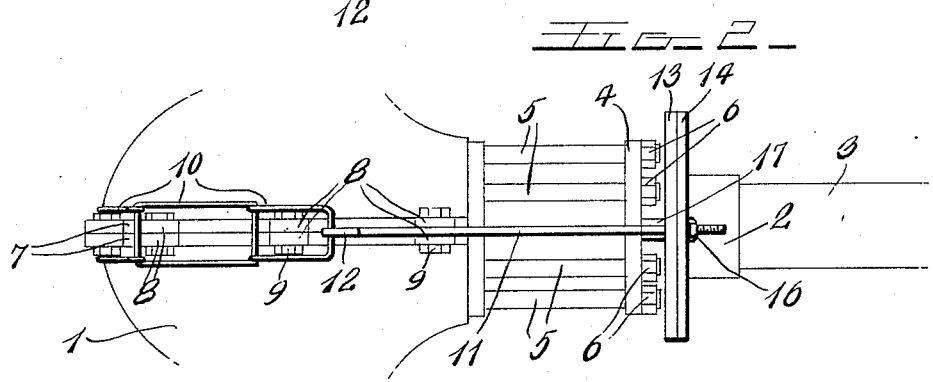
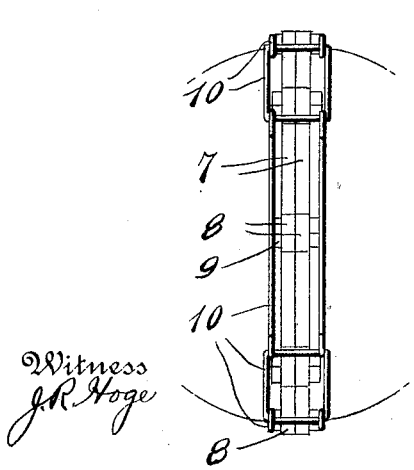
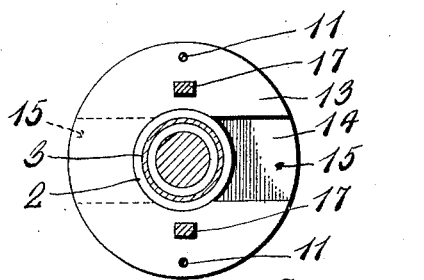
Inventor
M. J. Teel

UNITED STATES PATENT OFFICE.

MONROE J. TEEL, OF ANADARKO, OKLAHOMA.

VIBRATION-ABSORBING DEVICE.

1,383,350. Specification of Letters Patent. Patented July 5, 1921.

Application filed August 16, 1920. Serial No. 403,821.

*To all whom it may concern:*

Be it known that I, MONROE J. TEEL, a citizen of the United States, residing at Anadarko, in the county of Caddo and State of Oklahoma, have invented certain new and useful Improvements in Vibration-Absorbing Devices; and I do declare the following to be a full, clear, and exact description of the invention, such as will enable others skilled in the art to which it appertains to make and use the same.

This invention relates to an improved brace or vibration absorbing device for use in connection with the transmission of an automobile and particularly for use in connection with the differential housing to prevent the bolts thereof from working loose under the action of vibration.

One object of the invention is to so construct this device that it may be easily placed about the differential housing with the securing bolts and ears of the housing which receives the bolts fitting into the links of the chain forming part of the vibration absorbing device, and thus the vibration absorbing device is prevented from slipping out of engagement with the differential housing and the bolts are prevented from working loose.

Another object of the invention is to so construct this device that the disks which fit upon the sleeve receiving the drive shaft may be easily put in place and secured by means of the draw-rods connected with the end portions of the chain for passing about the differential housing.

Another object of the invention is to so construct this device that one of the disks may be provided with spacing lugs to retain the disks in spaced relation to a collar receiving bolts from the differential housing, the spacing of the disks from the collar permitting the securing nuts for the bolts to be easily tightened.

Another object of the invention is to provide a device which will be simple in construction and easy to operate.

This invention is illustrated in the accompanying drawings, wherein:

Figure 1 is a view in side elevation showing the device applied to a differential housing, Fig. 2 is a top plan view of the structure shown in Fig. 1, Fig. 3 is an end elevation showing the chain portion of the device positioned about the differential housing, and Fig. 4 is a transverse sectional view taken along the line 4—4 of Fig. 1.

The device is used in connection with the differential housing 1 which has a sleeve 2 extending therefrom for receiving the drive shaft 3. The sleeve 2 carries a collar 4 through which will extend the bolts 5 and these bolts are provided with the usual securing nuts 6. The differential housing is of a conventional construction and provided with the two side sections having flanges 7 provided with ears 8 through which extend the securing bolts 9.

This improved brace and vibration absorbing device is provided with a chain formed of links 10 which are formed of wire bent and hingedly connected as shown clearly in Figs. 2 and 3. These links receive the ears 8 and bolts 9 as shown in the drawing and will serve to hold the sections of the differential housing in close engagement and prevent the bolts from being worked loose by vibration. Draw-rods 11 are provided with hooked end portions 12 for engaging the end links of the chain and these draw-rods extend through registering openings formed in disks 13 and 14, the disks being provided with cut-outs or slots leading from their edges to their open centers. The slot 15 of the disk 13 is positioned out of registry with the slot of the disk 14 and it will thus be seen that each disk serves as means for closing the open end portion of the slot for the second disk. The draw-rods pass through the openings formed in the disks and when the securing nuts 16 are put in place and tightened, the disks will be held in place and will be prevented from coming out of engagement with the sleeve 2. One of the disks is provided with spacing lugs 17 for engaging the collar 4 and thus holding the inner collar 13 in spaced relation to this collar 4 and out of engagement with the bolts 5 or securing nuts 6 for these bolts 5.

When in use, the disks are put in place with the sleeve extending through the slots 15 which extend in opposite directions as shown in Fig. 4, and the end portions of the draw-rods will be passed through the openings of the disks. The chain will pass about the differential housing as shown and when the securing nuts are tightened, the disks will be held firmly in place and the draw-rods will be moved to tighten the chain about the differential housing. When it is desired to remove this device, it is simply necessary to remove the nuts 16 and the device can be taken apart and removed.

It will thus be seen that there has been provided a vibration absorbing device which is simple in construction, easy to operate and which may be easily and quickly put in place or removed.

What is claimed is:

1. The combination with a transmission casing including a differential housing and a drive shaft sleeve having a bolt receiving collar, said differential housing having separable side sections having ears provided with bolt receiving openings and securing bolts passing through said openings, of a vibration take-up device comprising a chain of elongated links receiving the ears and securing bolts of said differential housing, draw-rods connected with the ends of said chain, disks cut from opposite sides to provide open slots receiving the shaft and sleeve and having registering openings for receiving the draw-rods, spacing blocks carried by one of said disks to hold the disks in spaced relation to the collar, and securing means for the draw-rods engaging the second disk.

2. The combination with a transmission casing including a differential housing having side sections bolted together and a drive shaft sleeve having an outstanding collar, of disks upon the sleeve, spacing lugs upon one disk engaging the collar, draw-rods passing through the disks and having tightening nuts engaging one of the disks, and a chain of elongated pivotally connected links carried by the rods and extending about the differential housing and having the bolts positioned in its links.

3. The combination with a transmission casing including a differential housing having side sections bolted together and a drive shaft sleeve, of a chain of links extending about the housing with the bolts positioned in its links and tightening means for the chain carried by the sleeve and connected with the chain.

4. A brace of the character described comprising a chain of elongated pivotally-connected links, disks for fitting upon a sleeve, and draw-rods having connection with the chain and passing through openings in said disks.

5. The structure of claim 4 having the disks cut from opposite sides to provide sleeve receiving slots, and spacing lugs carried by one of said disks.

In testimony whereof I have hereunto set my hand.

MONROE J. TEEL.